No. 776,946. PATENTED DEC. 6, 1904.
F. W. RUPPMAN.
DOOR HOLDER.
APPLICATION FILED JUNE 10, 1904.
NO MODEL.
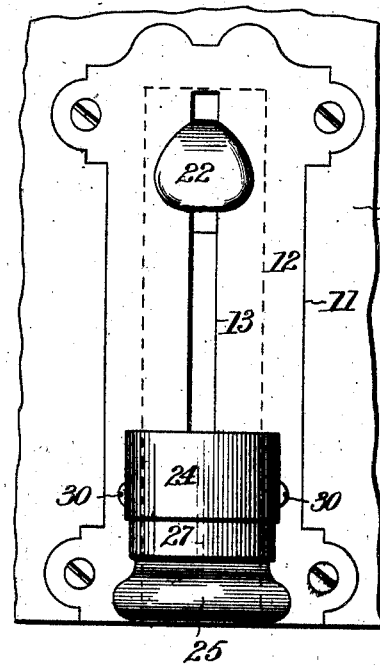
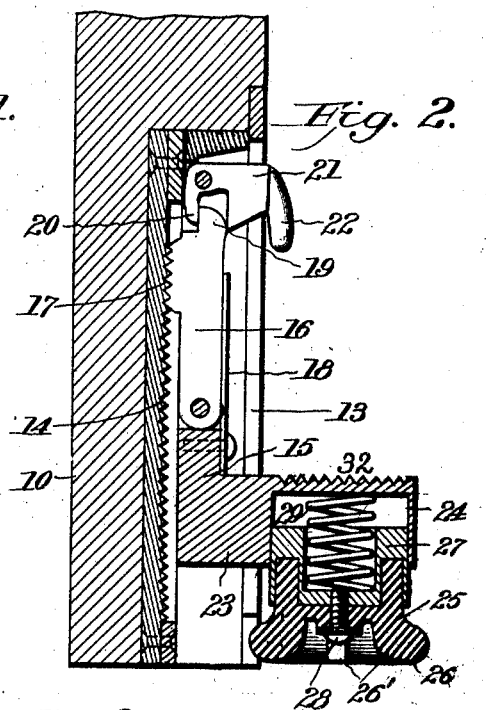
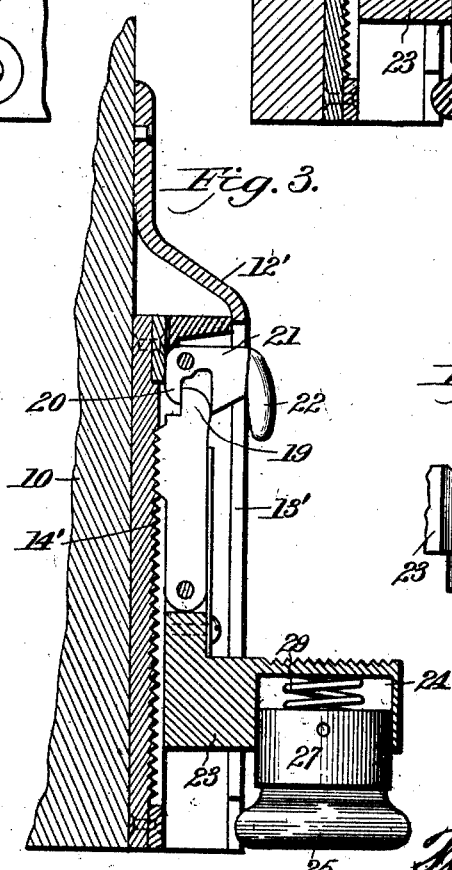
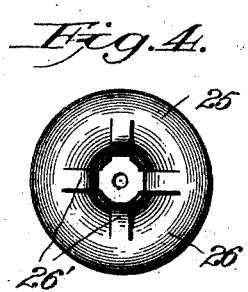
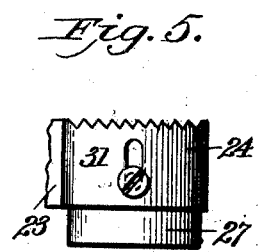
WITNESSES:
INVENTOR
Frank W. Ruppman
By Henry P. Blair
Attorney No. 776,946. Patented December 6, 1904.

UNITED STATES PATENT OFFICE.

FRANK W. RUPPMAN, OF PHILADELPHIA, PENNSYLVANIA.

DOOR-HOLDER.

SPECIFICATION forming part of Letters Patent No. 776,946, dated December 6, 1904.

Application filed June 10, 1904. Serial No. 211,988. (No model.)

*To all whom it may concern:*

Be it known that I, FRANK W. RUPPMAN, of Philadelphia, in the county of Philadelphia and State of Pennsylvania, have invented certain new and useful Improvements in Door-Holders; and I do hereby declare the following to be a full, clear, and exact description of the invention, such as will enable others skilled in the art to which appertains to make and use the same.

This invention relates to certain new and useful improvements in door-holders, and is particularly designed as an improvement upon the door-holder for which Letters Patent of the United States No. 642,261 were granted to me on the 30th day of January, 1900.

The invention has for its object the production of improved floor-engaging means attached to a door, whereby the latter may be held open at any desired angle.

A further object is to provide means for preventing the accidental disengagement of the floor-engaging means, and yet allow for its ready release when desired.

The invention will be hereinafter fully set forth, and particularly pointed out in the claims.

In the accompanying drawings, Figure 1 is a front elevation illustrating my improved door-holder. Fig. 2 is a longitudinal sectional view thereof. Fig. 3 is a similar view of a slight modification. Fig. 4 is a detail plan view of the floor-engaging disk. Fig. 5 is a detail.

Referring to the drawings, 10 designates a door provided with a mortise or recess 11, arranged to receive the casing 12. Said casing is provided with a slotted face-plate 13, and the rear wall of the casing has its inner face provided with a plurality of rack-teeth 14. A carrier 15 is arranged to reciprocate within the casing 12, said carrier being provided with a pivoted member 16, having rack-teeth 17, held normally in engagement with the rack-teeth 14 by means of a suitable spring 18. The pivoted member 16 is provided with a lip or projection 19, which normally rests in a recess formed between the body of a lever 21 and a lip 20 projecting therefrom, said lever being pivotally supported in carrier 15, whereby a movement of said lever is communicated to said member 16. Lever 21 is provided with a weighted toe-piece 22, which serves to hold member 16 normally in engagement with the rack-bar. In this connection it will be noted that spring 18 may be dispensed with, but I prefer to employ the same for the purpose of assisting the weight 22. The carrier 15 is provided at its lower end with an angular extension 23, which is enlarged to form a cylindrical socket 24, arranged to receive the floor-engaging disk and its adjuncts. The floor-engaging device comprises a disk 25, formed of rubber or other similar material formed into approximately cup shape and provided with an annular rim or enlargement 26, strengthened by webs 26', extending diametrically across said cup portion. Said disk is provided with an annular flange arranged to fit in a corresponding socket of a holder 27, arranged to work in the socket 24. The disk 25 is preferably secured to the holder by means of a screw 28, and said holder is provided with an annular chamber adapted to receive a coil-spring 29, the upper end of which bears against the top wall of socket 24. The reciprocating movement of the holder 27 is limited by means of screws or lugs 30, working in slots 31 in socket 24. If desired, the top surface of said socket may be provided with corrugations 32, whereby the foot is prevented from slipping in operating the device.

In Fig. 3 I have shown a slight modification of my invention, which consists, essentially, in substituting a casing 12', arranged to be secured to the face of a door instead of being set in a mortise. Said casing is provided with a slotted face-plate 13', and the rear wall of the casing also has its inner face provided with rack-teeth 14'. In other respects this form is identical with that heretofore described.

In practice after my improved door-holder has been secured to a door in any suitable manner it is only necessary to press downward upon the top of the socket 24, and the disk 25 is thereby forced into close contact with the floor, the inclination of the rack-teeth 14 and 17 permitting of this movement, but resisting upward movement. It will be seen that the tension of the spring 29 and the natural resiliency of the disk 25 forces the rim 26 of the latter against the floor, the compression thereof causing the cup to have a vacuum-like action against the floor. When it is desired to release the holder, it is only necessary to tip upward the weighted toe-piece 22, whereupon the lug 20 will engage with the lip or projection 19 of the pivoted member 16, disengaging the latter from the rack-teeth 14, and thereupon the spring 29 will force the carrier 15 upward, thus disengaging the disk from the floor and allowing of the ready movement of the latter.

The advantages of my improved floor-holder will be at once apparent to those skilled in the art to which it appertains. It will be particularly observed that by making the floor-engaging disk of cup shape the same is caused to have a suction-like contact with the floor, and yet the shape thereof is constantly maintained by means of the strengthening-ribs. It will also be noted that the disk can be readily and quickly forced into contact with the floor and rigidly held against accidental disengagement, and yet a slight touch upon the disengaging-lever will readily release the parts.

I claim as my invention—

1. A door-holder comprising a casing having one wall provided with a rack-bar, a carrier mounted to reciprocate within said casing, a floor-engaging disk supported by said carrier, a dog pivotally supported at its lower end, and an overhanging lever embracing the free end of said dog, said lever being provided with a weighted toe-piece, whereby said dog is held normally in engagement with said rack-bar.

2. A door-holder comprising a casing having one wall provided with a rack-bar, a carrier mounted to reciprocate within said casing, a floor-engaging disk supported by said carrier, a dog pivotally mounted at its lower end in said carrier and engaging said rack-bar, said dog having its upper end provided with a lip, and a weighted lever also mounted in said carrier and having a depending lug adapted to overlap and engage said lip.

3. A door-holder comprising a casing provided with a rack-bar, a carrier mounted to reciprocate in said casing and provided with a socket, a floor-engaging disk mounted to reciprocate within said socket, a dog pivotally mounted at its lower end in said carrier and adapted to engage said rack-bar, and a weighted lever also pivotally mounted in said carrier and provided with a depending lip overlapping and engaging the free end of said dog.

4. A door-holder comprising a casing provided with a rack-bar, a carrier mounted to reciprocate within said casing and provided with an angular extension having a socket, a spring-pressed holder mounted in said socket, a floor-engaging disk carried by said holder, a dog pivotally mounted at its lower end in said carrier, and a lever having an overhanging portion embracing the free end of said dog, said lever being provided with a weighted toe-piece, whereby said dog is held normally in engagement with said rack-bar.

5. The combination with a door having a recess or socket therein, of a casing adapted to fit within said recess, said casing having one wall provided with a rack-bar, the opposite wall thereof being provided with a slotted face-plate, a carrier mounted to reciprocate in said casing and provided with an angular extension having a socket formed therein, a floor-engaging disk mounted in said socket, a dog pivotally mounted at its lower end, and a lever having a depending lip adapted to overlap the free end of said dog, said lever being provided with a weighted toe-piece.

In testimony whereof I have signed this specification in the presence of two subscribing witnesses.

FRANK W. RUPPMAN.

Witnesses:
JOHN H. MICHAEL,
JAS. P. MCGONIGAL, Jr.